Figure 1:
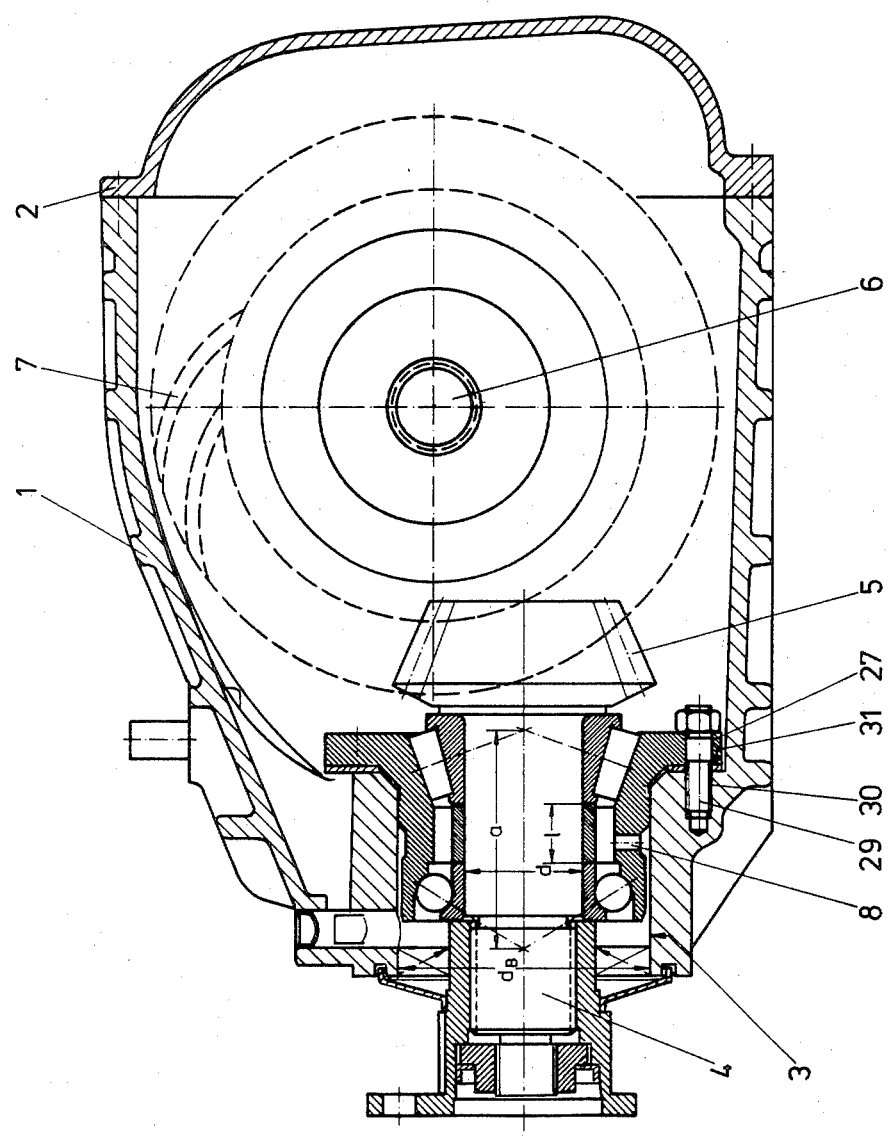

United States Patent [19]

Hüber et al.

[11] Patent Number: 4,729,252

[45] Date of Patent: Mar. 8, 1988

[54] BEARING FOR THE SHAFT OF A MACHINE ELEMENT

[75] Inventors: Wolfgang Hüber, Schweinfurt; Dietmar Frase, Dittelbrunn; Ludwig Feuerer, Gochsheim, all of Fed. Rep. of Germany

[73] Assignee: SKF Kugellagerfabriken GmbH, Schweinfurt, Fed. Rep. of Germany

[21] Appl. No.: 229,443

[22] Filed: Jan. 29, 1981

[30] Foreign Application Priority Data

Feb. 6, 1980 [DE] Fed. Rep. of Germany ....... 3004316

[51] Int. Cl.[4] ........................... F16H 1/14; F16H 1/20
[52] U.S. Cl. ..................................... 74/417; 74/606 R
[58] Field of Search ...................... 74/606 R, 606 A; 308/DIG. 14, 189 R, 207 R, 214; 74/417, 416

[56] References Cited

U.S. PATENT DOCUMENTS

| 2,910,882 | 11/1959 | Wellaver | 74/606 R |
| 4,226,485 | 10/1980 | Pruvot | 308/207 R |
| 4,233,855 | 11/1980 | Olschewski et al. | 308/189 R X |
| 4,309,915 | 1/1982 | Nozawa et al. | 74/339 |

Primary Examiner—Lawrence Staab
Attorney, Agent, or Firm—Rosen, Dainow & Jacobs

[57] ABSTRACT

A bearing having two rows of rolling elements has a flange extending outwardly from its outer ring. The flange is affixed to a facing surface inside of an aluminum housing, with a portion of the outer ring extending, with a play fit, in a bore of the housing.

11 Claims, 2 Drawing Figures

BEARING FOR THE SHAFT OF A MACHINE ELEMENT

This invention relates to a bearing for the shaft of a machine element, especially a pinion shaft of a drive, comprising a two row, prestressed rolling bearing with a radially outwardly directed flange on the outer ring for supporting a shaft in a bore of a housing of light metal or the like.

Bearings for shafts having a two row prestressed rolling bearing are already known. DE-OS No. 27 53 108 shows a bearing arrangement, especially for use in a pinion bearing for rear axle drives. In this arrangement there is an outer ring common to both of the bearing rows. One end of the outer ring has a radially extending support flange having support holes. The bearing also has two separate inner rings, and a spacing ring between the inner rings. The axial length of the spacing ring is suitably selected for the desired prestress in the bearing. The outer surface of the outer ring of this known rolling bearing has, with the exception of annular grooves between the rolling body rows, a constant diameter. This known rolling bearing is so arranged in the bore of the drive housing, that it supports the cylindrical outer surface over its whole length in the cylindrical bore of the drive housing, with an interference fit in the radial direction. The radial flange of the outer ring abuts, as a rule, the outer facing side of the drive housing, and serves thereby solely for the axial alignment of the bearing and thereby of the machine par extending therethrough.

There is a trend today, on the basis of cost and weight saving, to employ light metal housings, whereby, however, the different material expansion of light metal and antifriction bearing steel change in dependence on the temperature in the region of the interference fit between the bearing layer and housing, thereby resulting in change in the prestress force in the bearing. A change in the prestress force can result in large play in the bearing that influences the precision of the intermeshing between the teeth of the pinion and bevel gears. Increased noise development and larger wear follow, and in the extreme case this may lead to tooth failure, as well as the early failure of the bearing or even damage to the light metal housing.

The invention is therefore directed to the provision of a bearing of the above-described type, which is especially suitable for use with a light metal housing, wherein the drive experiences essentially no change of the prestress force as well as the geometrical proportions of the parts of the bearing as a result of changes of operation dependent characteristics such as temperature.

In accordance with one feature of the invention the bearing, in operation, is held in the housing in the axial as well as the radial direction, solely by the flange. There are no other holding positions of the bearing outer ring in the bore of the light metal housing, except a fitting with play. There is also a radial play between these parts. Consequently, the temperature influence on the pinion bearing is eliminated, so that in the event of increases of temperature there is no influence thereof on the prestress force. The large play which occurs in conventional bearings, as a result of changes in the prestress, and the resultant undesirable disadvantages of such play, are thereby prevented.

In order to avoid significant changes of the geometrical proportions of the machine elements that engage one another, for example, the tooth meshing in the gears, in accordance with a further feature of the invention, the rolling bearing is so arranged in the housing that the radially outwardly directed flange of the outer ring abuts an inner facing surface of the housing. The distance between the holding plane (i.e., the plane of this facing surface) and the plane in which the force originates on the machine elements is thereby as small as possible, and as a result the influence of temperature is as small as possible. This means, in a rear axle drive, that the influence of temperature on the tooth meshing is practically eliminated.

According to a further feature of the invention one of the radially overlying surfaces of the rolling bearing and housing, for example, the bore of the housing or the outer surface of the outer ring of the rolling bearing, is provided with a radially extending, relatively small centering surface, over the bore surface of the housing or outer surface of the outer ring. This centering flange serves essentially only to center the rolling bearing assembly accurately, before the holding screws of the flange are tightened to fasten the rolling bearing against the housing. It is thereby insured that the rolling bearing, and thereby also machine elements mounted thereon, for example, a pinion gear, are accurately centrally aligned in the bore of the housing. The centering surface can advantageously be formed as a centering collar arranged on the outer surface of the outer ring of the rolling bearing or in the bore of the housing.

Instead of an annular centering band, in accordance with a further feature of the invention, several centering projections may be distributed about the circumference of the bearing, the centering projections having a minor radial dimension and extending from the corresponding surface of the bearing.

According to a still further feature of the invention, the centering surface, i.e., the centering band or centering projections are arranged adjacent the outer ring. As a result, the rolling bearing cannot be installed in a tilted position.

In a further especially advantageous embodiment of the invention, the bearing rollers are formed of either balls or tapered rollers, and the contact lines of these elements are inclined to the turning axis of the bearing, whereby the rolling bearing on the one hand can withstand greater bending movements and on the other hand has a shorter length in the axial direction. The arrangement wherein the tapered rollers are provided in the bearing row adjacent the flange of the outer ring has the particular advantage that the flange is stiffened due to its location adjacent the bearing row having the highest force thereon. In order to reduce the bending of the shaft to a minimum the distance between the center pressure points, i.e., the intersection point of the contact lines of both rolling bearing rows with the turning axis of the rolling bearing, is preferably from 1.5 to 2.0 times the diameter of the pinion drive shaft.

Figure 2:
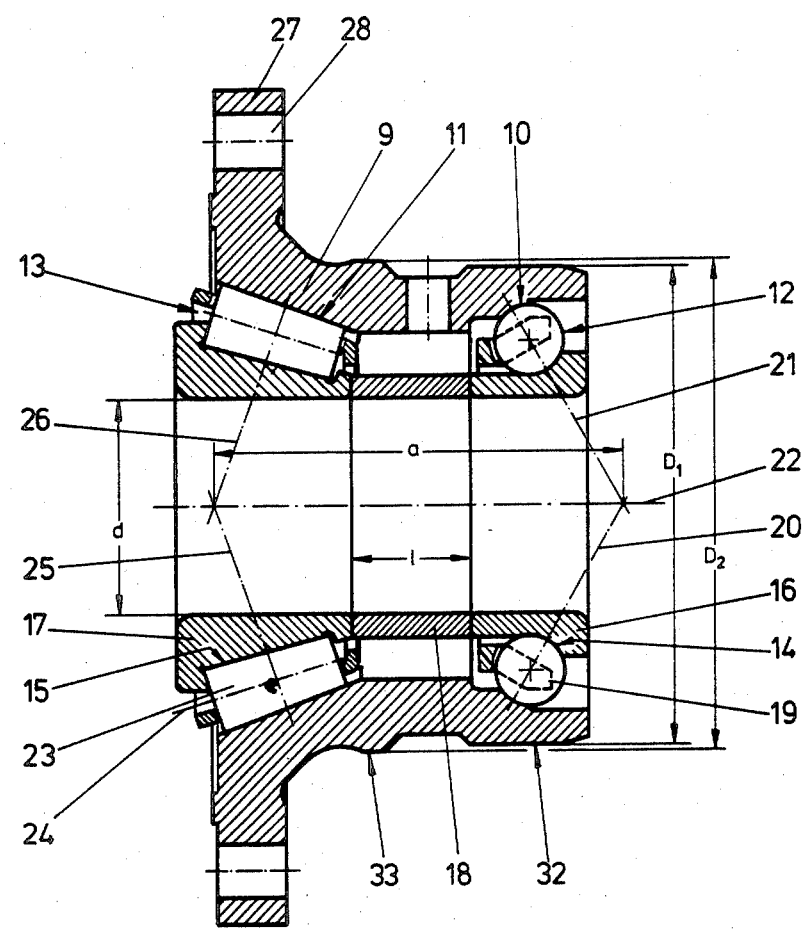

In order that the invention will be more clearly understood, it will now be disclosed in greater detail with reference to th accompanying drawings, wherein:

FIG. 1 a cross-sectional view of a rear axle drive taken along the center axis of the pinion gear; and FIG. 2 is an enlarged view of the bearing employed for the pinion gear of FIG. 1.

In order to more clearly disclose the invention, certain components are shown in exaggerated form therein.

Referring now to FIG. 1, therein is illustrated a rear axle drive consisting of a housing 1 of light metal, for example, an aluminum alloy. One end of the housing 1 is covered by a cover 2. A drive shaft 4, having a diameter "d", extends through a bore 3 in the other end of the housing 1. A pinion gear 5 is mounted on the forward end of the shaft 4. A drive shaft 6 extends through a bore in the housing at right angles to the drive shaft 4, and a bevel gear 7 is mounted on the drive shaft 6. The teeth of the bevel gear 7 and pinion gear 5 mesh, so that turning movements of the drive shaft 4 are translated into turning movements of the bevel gear. The pinion gear 5 is supported in the housing 1 by a two row rolling bearing 8. This two row bearing 8 is comprised of a common outer ring 9 having races 10 and 11 for the rows 12 and 13 respectively of rolling bodies. The bearing 8 has two axially separated inner rings 16 and 17, with races 14 and 15 respectively on their outer surfaces, these races facing the races 10 and 11 respectively. A spacing ring 18 is positioned axially between the inner rings 16 and 17 and abutting these inner rings. The spacer 18 has an axial length $+1''$ that is selected or prearranged, corresponding to the desired preloading of the bearing. The row 12 of rolling bodies is comprised of balls 19, of which two diametrically opposite balls are shown in FIG. 2. The contact lines 20, 21 of these two balls, i.e., the diametrical lines of the balls extending through the contact points of the balls with the race 10 of the outer ring 9 and the race 14 of the inner ring 16, are inclined to the turning axis 22 of the rolling bearing 8. The rolling bodies of the other rolling body row 13 are tapered rollers 23, whose turning axes 24 are likewise inclined to the turning axis 22 of the bearing 8, so that the contact lines 25, 26 of the two diametrically opposite tapered rollers shown intersect the turning axis 22 of the rolling bearing 8 likewise at an angle less than 90°. The contact lines 20, 21, 25 and 26 form an "O" so that the rolling bearing rows 12 and 13 may be said to be in an "O-arrangement". In other words, the contact lines of each row converge towards the respective axial end of the bearing. The intersection points between the contact lines 20, 21 and 25, 26 with the turning axis 22 of the rolling bearing 8, i.e., the so-called center pressure points, lay relatively far from one another, so that a wide support base for the drive shaft 4 is obtained. The length "a" of this support base, i.e., the distance between the center pressure point is advantageously chosen such that depending on the diameter "d" of the drive shaft 4, and the force action plane, the sagging or bending of the shaft is a minimum. In one example, this result is obtained when the ratio a/d equals 1.5 to 2.0.

The outer ring 9 of the rolling bearing 8 is formed on one end, i.e., the end in the region of the row 13 of tapered rollers 23, with an annular radially outwardly directed flange 27. Several axially directed bores 28 are distributed about the circumference of this flange. Studs 29 in threaded holes 30 of the housing, extend axially through the holes 28 of the flange, with nuts being threaded on the bolts to firmly hold the bearing to extend axially in the housing. In this manner the bearing arrangement is so arranged that one end of flange 27 lays against the inner facing surface 31 of the housing 1, whereby the distance between the axis of the drive shaft 6 and the attachment plane of the bearing to the pinion gear shaft is very small. Consequently, influences of temperature on the meshing of the teeth of the gears is reduced to a minimum. The outer surface 32 of the outer ring 9 of the rolling bearing 8 is provided in the vicinity of the flange 27, with a relatively small projecting band 33 with a diameter $D_2$ slightly greater than the diameter $D_1$ of the surface 32. This centering band 33 is fit in the inner surface of the bore 3, such that in the cold condition there is zero or a minimum play. The bore 3 has a diameter $d_B$. Before and during the assembly of the rolling bearing 8 in the drive, the diameter $D_2$ of the centering band 33 is smaller or the same as the diameter $d_B$ of the bore 3. The prestress is thereby not influenced by the necessity of overcoming an interference fit during the assembly.

The centering band 33 thereby serves to straighten out the rolling bearing 8 in the assembly of the rear axle drive to be actually centered with respect to the bore 3, whereby the threaded bolts 29 are held fast and firmly hold the rolling bearing 8 in the axial and radial directions. The remainder of the outer surface 32 of the outer ring has a greater play with respect to the inner surface of the bore 3 (having a diameter $d_B$) due to its lesser diameter $D_1$ so that the rolling bearing 8 is supported in the housing solely by the flange. When the rear axle drive is heated, the housing 1, of light metal, expands more than the rolling bearing 8 of antifriction bearng seal, due to the higher thermal expansion coefficient of the light metal. Since the rolling bearing 8 is radially supported by the flange 27, and not in the bore 3, the expansion of the bore 3 of the housing has substantially no influence on a nonexistent interference fit between the outer surface of the outer rings 9 and the boring 3 of the housing 1, and thereby also has no effect on the preloading in the rolling bearing 8. Since the parts of the rolling bearing 8 are prepared from the same material, and consequently have the same thermal expansion coefficient, the prestress in the rolling bearing does not change, or only changes to an insignificant extent. Consequently, the heating of the rear axle drive does not result in temperature dependent increase of the bearing play of the pinion bearing, which would negatively influence the accuracy of the intermeshing of the gear teeth and thereby would lead to greater noise and wear.

Tests with a structure in accordance with the invention have shown that, in such a bearing arrangement in a light metal housing with respect to prestress forces and axial stiffness, the bearing of the invention has more favorable properties than comparable conventional bearings. In the radial direction, with respect to the tooth mesh displacement there is no deterioration of bearing characteristics, as opposed to conventional bearing structures. The thermally dependent influence on the tooth mesh displacement is also much lower.

It is possible, alternatively to the above-described example of the invention, to change the construction of the bearing. Thus, instead of an annular centering band 33, the surface 32 of the outer ring may be provided with several individual projections distributed about its circumference, such projections serving to center the bearing. If a ring band is provided, it can be formed as a part of the outer ring itself, but it is also possible to employ a separate ring adapted to be assembled on the outer surface of the outer ring. In general, the centering surface, instead of being on the outer surface of the outer ring, may alternatively be provided in the bore of the housing, whereby the centering band, individual centering projections, or the like are provided directly in the bore or are separately formed and assembled in the bore.

Instead of the above-disclosed rolling bearing having one row of tapered rollers and one row of balls, it is possible, in accordance with the invention, to alternatively provide the bearing with two rows of balls or two rows of tapered bearings. Further, instead of the above-described "O-arrangement", the rolling body rows can obviously be selected to have an "X-arrangement". Finally, it is evident that the invention is not limited to a bearing for a pinion shaft of a rear axle drive. Thus, the invention may be employed for other types of bearings for a shaft of a machine element in a housing of light metal or the like.

What is claimed is:

1. In a rolling bearing for the shaft of a machine element, the bearing having two rows of prestressed rolling bearing elements, a radially outwardly directed flange on the outer ring thereof, said outer ring forming the outer races for said bearing elements and being positioned in the bore of a housing of a material of different thermal characteristics than said ring, the improvement wherein the rolling bearing is positioned whithin the housing with said flange abutting an inner facing surface of the housing, the rolling bearing is affixed to said housing solely by holding means for holding said flange to the facing surface of the housing, said bearing thereby being held axially and radially in the housing, said bore and ring having radially directed surfaces facing one another, one of said surfaces having a centering portion projecting slightly therefrom toward the other said surface to center said bearing, the remaining portions of the radially facing surfaces of the bore and the ring having a play fit with respect to one another.

2. The bearing of claim 1, wherein said centering surface is on the outer surface of the outer ring of the rolling bearing and projects radially outwardly therefrom.

3. The bearing of claim 1, wherein said centering surface is in the bore of the housing and projects radially inwardly therefrom.

4. The bearing of claim 1, wherein the centering surface comprises a relatively small radially thin centering band.

5. The bearing of claim 1, wherein said centering surface is positioned adjacent said radial flange of the outer ring.

6. The bearing of claim 1, wherein said rolling body rows are mounted in an O-arrangement.

7. The bearing of claim 1, wherein one of the rolling body rows has tapered rollers with contact lines inclined to the turning axis of the rolling bearing and the other rolling bearing row has balls arranged with their contact lines being inclined to the turning axis of the rolling bearing.

8. The bearing of claim 7, wherein the tapered rollers of said one rolling body row are adjacent said flange.

9. The bearing of claim 6 further comprising a shaft in the bore of said bearing, wherein the distance between the intersection points of the contact lines with the turning axis of the rolling bearing being from 1.5 to 2.0 times the diameter of said shaft.

10. A bearing assembly comprising a bearing having two rows of rolling elements, and an outer ring, a flange extending radially outward from said outer ring, a housing of light metal having a bore and an internal surface normal to said bore, said flange axially abutting said internal surface and being affixed thereto, with said outer ring extending into said bore with a play fit for a substantial portion of its length, one of the internal surface of said bore and the facing outer surface of said outer ring having a centering projection extending a very small distance from the respective surface, to enable centering of said bearing before affixing said flange to said internal surface.

11. The bearing assembly of claim 13, further comprising a pinion gear in said housing and mounted on a shaft supported by said bearing, and a second gear mounted on a drive shaft in said housing having teeth engaging the teeth of said pinion gear, whereby the teeth of the pinion gear and second gear define a location of force transfer, the plane of said internal surface being adjacent to said location whereby thermal changes in said assembly have no substantial effect on intermeshing of the teeth of said gears.

* * * * *